(12) United States Patent
Hecht et al.

(10) Patent No.: US 11,285,548 B2
(45) Date of Patent: Mar. 29, 2022

(54) SINGLE-SIDED THREE-WAY INDEXABLE MILLING INSERT HAVING HIGH VOID VOLUME TO MATERIAL VOLUME RATIO AND INSERT MILL THEREFOR (71) Applicant: Iscar, Ltd., Tefen (IL)

(72) Inventors: Gil Hecht, Nahariya (IL); Adi Shapir, Kiryat Haim (IL)

(73) Assignee: Iscar, Ltd., Tefen (IL)

(*) Notice: Subject to any disclaimer, the term of this patent is extended or adjusted under 35 U.S.C. 154(b) by 0 days.

(21) Appl. No.: 16/202,288

(22) Filed: Nov. 28, 2018

(65) Prior Publication Data

US 2019/0160558 A1 May 30, 2019

Related U.S. Application Data

(60) Provisional application No. 62/592,751, filed on Nov. 30, 2017.

(51) Int. Cl.
*B23C 5/10* (2006.01)
*B23C 5/22* (2006.01)
*B23C 5/00* (2006.01)

(52) U.S. Cl.
CPC .............. *B23C 5/006* (2013.01); *B23C 5/109* (2013.01); *B23C 5/2221* (2013.01);
(Continued)

(58) Field of Classification Search
CPC ......... B23C 5/109; B23C 5/202; B23C 5/207; B23C 5/2213; B23C 5/2221;
(Continued)

(56) References Cited

U.S. PATENT DOCUMENTS 1,838,520 A * 12/1931 Archer ................ B23B 27/1614
407/104
4,606,248 A * 8/1986 Shikata ................... B23B 27/10
407/114
(Continued)

FOREIGN PATENT DOCUMENTS

DE  4312719 A1 * 10/1994 ........... B23B 27/141
DE  19703848 A1   7/1998
(Continued)

OTHER PUBLICATIONS

International Search Report dated Mar. 18, 2019, issued in PCT counterpart application (No. PCT/IL2018/051292).
(Continued)

*Primary Examiner* — Ryan Rufo
(74) *Attorney, Agent, or Firm* — Womble Bond Dickinson (US) LLP (57) ABSTRACT

A single-sided three-way indexable milling insert for feed milling operations, includes a positive basic shape, a rake surface, a peripheral surface including side abutment surfaces, a base bearing surface and a screw hole connecting the rake and base bearing surfaces. The insert has a cutting edge including exactly three main cutting sub-edges and three secondary cutting sub-edges. A material volume $V_F$ of the cutting insert and a void volume $V_S$ of the insert fulfill the condition $V_S/V_F \geq 0.30$.

28 Claims, 6 Drawing Sheets

(52) U.S. Cl.
CPC .............. *B23C 2200/0411* (2013.01); *B23C 2200/0477* (2013.01); *B23C 2210/165* (2013.01); *B23C 2210/168* (2013.01)

(58) Field of Classification Search
CPC ..... B23C 2200/0411; B23C 2200/0477; B23C 2200/0483; B23B 2200/0419; B23B 2200/0495
See application file for complete search history.

(56) References Cited

U.S. PATENT DOCUMENTS

| | | | |
|---|---|---|---|
| 4,648,755 A | 3/1987 | Stashko | |
| 4,812,087 A | 3/1989 | Stashko | |
| 5,226,761 A | 7/1993 | Satran et al. | |
| 5,741,095 A | 4/1998 | Charron et al. | |
| 5,772,364 A | 6/1998 | Satran et al. | |
| 6,004,081 A * | 12/1999 | Hellstrom | B23C 5/2221 407/103 |
| 6,508,612 B1 * | 1/2003 | Baca | B23C 5/006 407/113 |
| 6,877,935 B2 * | 4/2005 | Schlemmer | B23B 27/007 407/113 |
| 8,177,460 B2 | 5/2012 | Satran et al. | |
| 8,449,226 B2 * | 5/2013 | Nasu | B23B 27/141 407/113 |
| 8,596,935 B2 * | 12/2013 | Fang | B23B 27/007 407/11 |
| 8,740,509 B2 * | 6/2014 | Luik | B23C 5/207 407/42 |
| 9,370,833 B2 * | 6/2016 | Saji | B23B 27/141 |
| 2003/0072625 A1 * | 4/2003 | Morgulis | B23C 5/2221 407/35 |
| 2004/0234349 A1 | 11/2004 | Ueda et al. | |
| 2007/0189861 A1 | 8/2007 | Muren et al. | |
| 2008/0304925 A1 * | 12/2008 | Meyer | B23B 51/048 408/204 |
| 2013/0142581 A1 * | 6/2013 | Volokh | B23C 5/202 407/114 |
| 2013/0294850 A1 | 11/2013 | Park | |
| 2015/0202697 A1 | 7/2015 | Shiota et al. | |
| 2015/0246398 A1 | 9/2015 | Kawasaki | |
| 2017/0014914 A1 | 1/2017 | Yamaguchi | |
| 2017/0216940 A1 | 8/2017 | Aso | |
| 2018/0015554 A1 | 1/2018 | Roman | |

FOREIGN PATENT DOCUMENTS

| | | | | |
|---|---|---|---|---|
| DE | 10215876 A1 | 10/2003 | | |
| DE | 102008016732 | 6/2009 | | |
| DE | 102008019426 | 10/2009 | | |
| EP | 1736266 A1 * | 12/2006 | ............. | B23C 5/202 |
| EP | 2409801 A1 * | 1/2012 | ............... | B23C 5/06 |
| EP | 3050655131 | 3/2017 | | |
| GB | 2079656 A | 1/1982 | | |
| JP | S57 8003 A | 1/1982 | | |
| RU | 2610640 C1 | 2/2017 | | |

OTHER PUBLICATIONS

Written Opinion dated Mar. 18, 2019, issued in PCT counterpart application (No. PCT/IL2018/051292).

* cited by examiner

FIG.9C

SINGLE-SIDED THREE-WAY INDEXABLE MILLING INSERT HAVING HIGH VOID VOLUME TO MATERIAL VOLUME RATIO AND INSERT MILL THEREFOR

RELATED APPLICATIONS

The present application claims priority to U.S. Provisional Patent Application No. 62/592,751, filed Nov. 30, 2017, the contents of which are incorporated by reference in their entirety.

FIELD OF THE INVENTION

The subject matter of the present invention relates to insert mills and single-sided three-way indexable milling inserts (hereinafter also "insert(s)") therefor. More particularly to relatively small such inserts and tool holders configured for feed milling operations.

BACKGROUND OF THE INVENTION

For the purposes of the present invention, end mills can be theoretically divided into two general groups, namely insert-mills and solid end mills.

Insert-mills are milling tools which comprise tool holders with pockets and replaceable inserts, typically indexable, configured to be mounted in the pockets. An advantage of insert-mills is that the replaceable inserts, which are made of comparatively expensive, harder, material constitutes a relatively small portion of the milling tool. The tool holders comprise a shank which is held securely by a collet or chuck during milling.

Unlike insert-mills which regularly require replacement of small inserts and less regularly require replacement of the tool holder, solid end mills comprise integrally formed teeth and the entire solid end mill is replaced after it is worn. Solid end mills also comprise an integrally formed shank which is held securely by a collet or chuck during milling. Accordingly, solid end mills utilize far more comparatively expensive material than insert-mills. Despite the comparatively higher cost, one of the advantages of solid end mills over insert-mills is that the solid end mill's single integrally formed body can be manufactured with a comparatively smaller diameter (typically less than 20 mm diameter, with smaller diameters being more popular, e.g., at about 12 mm diameter or less) allowing milling in relatively smaller locations than is possible or practical with insert-mills.

Accordingly, the present invention is directed to inserts and insert mills that have a range of design features that make them functionally and economically competitive with solid end mills at tool cutting diameters (also referred to as "cutting diameter(s)") of 20 mm and less, particularly in the range of 9 to 16 mm. More particularly, in the range of 9 to 12 mm.

A publication of interest is EP 3050655, which discloses single-sided two-way indexable inserts for small diameter tool holders.

SUMMARY OF THE INVENTION

The present invention provides a single-sided three-way indexable cutting insert for feed milling operations for small diameter tool holders. Three indexable positions are typically preferred over the two indexable positions disclosed in EP 3050655, yet the design chosen in EP 3050655 was deliberately chosen to have only two indexable positions, presumably because this was the optimal design conceived by the inventors thereof for small diameter tool holders.

Notably, three-way indexable cutting inserts are disadvantageous in numerous ways when compared with two-way indexable cutting inserts. Firstly, because imprecisions in manufacturing have a greater effect on runout (due to the acute angle formed by the tool abutment surfaces) leading to greater instability during machining. Secondly, because larger dimensions of the cutting insert create greater moment when cutting forces are applied to a cutting edge also leading to greater instability during machining. Thirdly, and perhaps most significantly, because three-way indexable inserts are wider, they are more problematic to design for small diameter tools, as will be further discussed below.

Nonetheless, the present invention conceives that even for very small diameter insert mills (i.e. having a cutting diameter of 9 to 12 mm, or more particularly at about 10 mm) a three-way indexable insert, e.g. of generally triangular shape (at least with respect to the main cutting edges), can provide an overall benefit relative to the known prior art.

As mentioned above, three-way indexable inserts for feed milling operations are comparatively wider than, for example, the two-way indexable inserts of the type shown in EP 3050655 (also US2018015554A1). Stated differently, they have a relatively larger radial dimension (i.e. in a direction perpendicular to rotation axis when mounted to a tool holder) limiting them to traditionally being used with relatively large diameter tools. The reason for this is because in order to provide a reasonably sized main cutting edge (the main cutting edge for a feed milling insert mill being the edge that provides this operation) and three-way symmetry, the radial dimension of the insert is dependent on the length of the cutting edge. This is not the case with the side bearing surface of the elongated insert type shown in EP 3050655 which has a radial dimension independent of the main edge's cutting edge length, and which can be minimized in accordance with a minimum wall strength required adjacent a screw hole thereof. Since a three-way indexable insert cannot have the radial dimension thereof minimized in the same way, a tool configured for holding such inserts has reduced material at the core thereof. Such reduction being less significant for drills which have primarily axial forces or larger diameters which still have significant core sizes, but are very significant for the present invention relating to small diameter milling tools with significant radial cutting forces. Attention is drawn to FIG. 13 of EP 3050655 in which it can be seen that the core diameter corresponds to roughly to the width of each of the cutting inserts shown. It will be understood that there is a concern that reduction in core diameter can lead to unacceptable bending of the tool holder. While relatively small diameter drills are known, it will be understood that insert mills are subjected to greater radial forces than drills, due to the nature of a milling operation including non-axial movement of the tool holder.

Accordingly, the present invention provides an insert mill for cutting tool diameters of 9 mm to 12 mm, and most particularly to a cutting tool diameter of about 10 mm which is significantly harder to design than insert mills with larger cutting tool diameters, especially when providing three-way indexable inserts.

Additionally, a number of advantageous features have been incorporated, each of which is designed to allow economical production in order for an insert mill of small diameter to be competitive against solid end mills of similar diameter, as will be described below.

According to a first aspect of the present invention, there is provided a single-sided three-way indexable cutting insert having a positive basic shape and having a volume ratio $V_S/V_F$ of the void volume $V_S$ and a material volume $V_F$ defined by the amount of material of the cutting insert fulfills the condition: $V_S/V_F \geq 0.30$.

According to a second aspect of the present invention, there is provided a single-sided three-way indexable cutting insert having a positive basic shape and comprising: a material volume ($V_F$) defined by the amount of material of the cutting insert; a rake surface; a base bearing surface located opposite the rake surface; an insert axis ($A_I$) extending perpendicular to the base bearing surface and through a center of the insert, the insert axis defining: an upward direction from the base bearing surface towards the rake surface, a downward direction opposite to the upward direction, and an outward direction perpendicular to the upward and downward directions and extending away from the insert axis; a cutting insert height ($H_I$) measurable parallel to the insert axis, from the base bearing surface to a highest point of the rake surface; a peripheral surface connecting the rake surface and base bearing surface; a cutting edge formed along an intersection of the peripheral surface and the rake surface, the cutting edge defining, in a view parallel to the insert axis ($A_I$), an imaginary edge circumscribed circle ($C_E$) having an edge circumscribed diameter ($D_E$); and a screw hole opening out to the rake and base bearing surfaces, the screw hole comprising: a screw hole bottom at an intersection with the base bearing surface; a screw hole top at an intersection with the rake surface; a void volume ($V_S$) calculated as the volume of a void extending from the screw hole bottom to the screw hole top; and a hole circle ($C_S$) defined, in a view parallel to the insert axis ($A_I$), at an intersection of the rake surface and the screw hole, the hole circle ($C_S$) having a hole diameter ($D_S$); the base bearing surface defined, in a bottom view parallel to the insert axis ($A_I$), an imaginary base circumscribed circle ($C_B$) having a base diameter ($D_B$); the peripheral surface comprising: first, second, third, fourth, fifth and sixth side abutment surfaces; the cutting edge, in a top view parallel to the insert axis ($A_I$), defining an edge inscribed circle ($C_M$) having an edge inscribed diameter ($D_M$), the cutting edge comprising: exactly three main sub-edges and exactly three secondary sub-edges, the main sub-edges alternating with the secondary sub-edges with a corner sub-edge at each intersection between the main and secondary sub-edges; wherein: the base circumscribed diameter ($D_B$) is smaller than the edge circumscribed diameter ($D_E$); and a volume ratio of the void volume ($V_S$) to the material volume ($V_F$) fulfills the condition: $V_S/V_F \geq 0.30$.

Figure 9A:
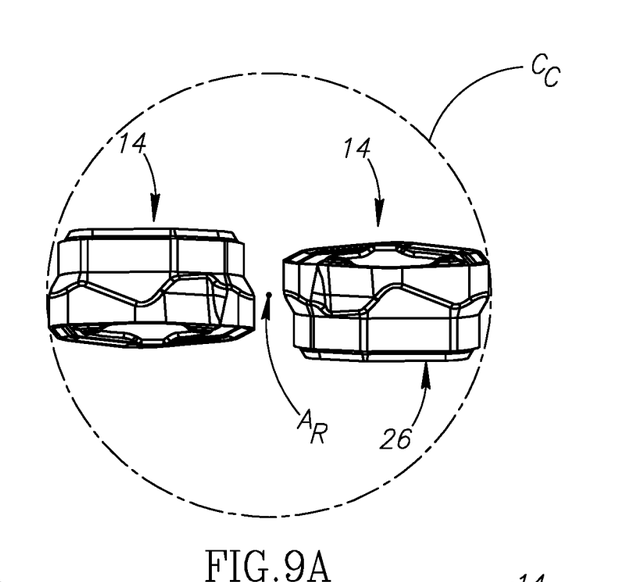
FIG. 9A is a view of the inserts shown in FIG. 1C, without the tool holder and screws being shown, and schematically showing the tool circumscribing cutting diameter circle.

Having a positive basic shape is allows an insert's base bearing surface to be relieved (i.e. spaced inwardly from a cutting tool diameter as shown in FIG. 9A) which is important for the present invention directed to extremely small diameter insert mills.

Additionally, allowing a pressing process with as little machining as possible, as disclosed in EP 3050655B1 (par. [0034]), also contributes to the economic advantage of the present design. It will be noted that the term "positive basic shape" more specifically means that cross sectional areas nearer to a base bearing surface of the insert are smaller than cross sectional areas further away therefrom, but does not require all of the peripheral surfaces to be continuously slanted. For example, at certain sections of the insert the surfaces may extend parallel with an insert axis. One way that the positive basic shape is defined is to say that the base circumscribed diameter $D_B$ is smaller than the edge circumscribed diameter $D_E$.

The amount of material of the insert itself can be minimized. It has been found that the volume ratio $V_S/V_F$ defined above has performed successfully. It will be understood that the size of the insert must be minimized while a minimum volume of material is needed for structural strength. Additionally, minimizing the amount of material and providing three indexable positions can provide an economic advantage.

According to a third aspect of the present invention, there is provided a single-sided three-way indexable cutting insert wherein an insert thickness diameter ratio $D_S/D_M$ of the hole diameter $D_S$ and the edge inscribed diameter $D_M$ fulfills the condition: $D_S/D_M > 0.60$.

This aspect is similar to the aspects above in that it defines a minimum volume of material needed for structural strength, albeit in a different way. It will be noted from the drawings that the weakest structural portion of the insert is the material located approximately between the hole diameter $D_S$ and the edge inscribed diameter $D_M$. Accordingly, an insert thickness diameter ratio $D_S/D_M$ according to the value given above performed successfully.

According to a fourth aspect of the present invention, there is provided a single-sided three-way indexable cutting insert with main sub-edges; wherein an edge length ratio $L_M/L_S$ of a main edge length $L_M$ and a secondary edge length $L_S$, each of which including half of the adjacent corner sub-edges fulfills the condition: $L_M/L_S > 0.80$.

Typically, a feed insert has a significantly larger edge length ratio $L_M/L_S$ than that defined above. This is because the majority of a feed operation is carried out with the main sub-edge and thus it is desirable to make it longer and reduce machining time. In one non-limiting but preferable embodiment, the length of the main edge is reduced to allow faster table speed.

According to a fifth aspect of the present invention, there is provided a single-sided three-way indexable cutting insert with main sub-edges; wherein an edge circumscribed diameter $D_E$ fulfills the condition: $D_E < 6$ mm.

It will be understood that a reduction in insert size also reduces the chip size that such insert can remove, making it less efficient. Nonetheless, a particularly small insert is required to accommodate two inserts in a small cutting diameter tool holder. This is despite the fact that a two-way indexable insert of similar size would have been far easier to accommodate.

Since the cutting insert of the present invention is small, it has been found that distortion caused by the sintering process is within reasonable tolerances and peripheral grinding of the cutting insert can be avoided. Thus, the insert can be provided with an unground lower sub-surface. As is known in the art, ground surfaces can be identified by grinding lines and discontinuity lines where a planar ground surface ends and an unground surface starts.

While each of the main design features mentioned above (namely, volume ratio, insert thickness diameter ratio, edge length ratio, and small edge circumscribed diameter $D_E$) are believed to be individually advantageous, it should be understood that the present invention envisions any combination of any such features on a positive basic shape, three-way indexable single sided insert to be even more advantageous.

Similarly, any of the optional features below can be applied to each aspect above.

It will be understood that a greater volume ratio $V_S/V_F$ utilizes less material. Accordingly, it is preferred that the volume ratio fulfills the condition: $V_S/V_F > 0.35$, or even $V_S/V_F > 0.40$. An approximated maximum volume ratio for acceptable modern cutting conditions is, theoretically, believed to fulfill the condition: $V_S/V_F<0.50$. With a largest ratio having a reasonable safety factor being $V_S/V_F<0.45$.

Similarly, a greater insert thickness diameter ratio $D_S/D_M$ utilizes less material. Accordingly, it is preferred that the volume ratio fulfills the condition: $D_S/D_M>0.65$. An approximated maximum insert thickness diameter ratio for acceptable modern cutting conditions is, theoretically, believed to fulfill the condition: $D_S/D_M<0.80$. With a largest ratio having a reasonable safety factor being $D_S/D_M<0.75$.

A greater edge length ratio $L_M/L_S$ allows acceptable cutting width while reducing the main feed edge length. Accordingly, in some embodiments the edge length ratio $L_M/L_S$ fulfills the condition: $L_M/D_E>0.80$, more preferably $L_M/D_E>1.0$. An approximated maximum insert thickness diameter ratio for economic machining is, theoretically, believed to fulfill the condition: $L_M/D_E<1.2$.

A secondary edge length $L_S$ is a length of the secondary edge includes half of the corner sub-edges adjacent thereto, and an effective ramp edge length $L_R$ is a length of the secondary edge measured adjacent a relieved peripheral surface portion. According to some embodiments the effective ramp edge length $L_R$ fulfills the condition: $0.4 L_S>L_R>0.8 L_S$.

It will be understood that even though the edge circumscribed diameter $D_E$ defined above allows the lower sub-surface to be unground, even smaller sizes will more easily be accommodated by a tool holder. Accordingly, it is preferred that the edge circumscribed diameter $D_E$ fulfills the condition: $D_E<5.5$ mm.

An approximated minimum feasible size for such three-way indexable insert and capable of acceptable modern cutting conditions is, theoretically, believed to fulfill the condition: $D_E>4$ mm. With a largest edge circumscribed diameter $D_E$ having a reasonable safety factor being $D_E>4.5$ mm.

Preferably, a positive rake angle is formed along the entire cutting edge.

Preferably, in a top view parallel to the insert axis $A_I$, all internal angles $\lambda$, formed between the main and secondary sub-edges are obtuse. It is understood, however, that only alternate internal angles may have identical values.

An insert's peripheral surface can comprise a lower sub-surface and an upper sub-surface; the lower sub-surface extending upwardly or upwardly and outwardly, from the base bearing surface and comprising the first, second, third, fourth, fifth and sixth side abutment surfaces; an upper sub-surface connecting the lower sub-surface and the rake surface, and the upper sub-surface beginning in the upward direction at a minimum upper surface height $H_U$ above the base bearing surface.

Preferably, the lower sub-surface extends only upwardly (i.e. perpendicular to the base bearing surface). This is believed to provide a stable mounting position and also simplifies milling production of a tool holder pocket (allowing simple orthogonal milling thereof).

Preferably, the upper sub-surface extends more outwardly than the lower sub-surface.

It will be understood that a greater minimum upper sub-surface height $H_U$ allows a greater height of the lower sub-surface. The lower sub-surface provides a bearing function and hence a maximized height thereof provides greater stability to the insert when mounted in the pocket. Conversely, sufficient size of the upper sub-surface is needed for the cutting function. Accordingly, it is preferred that the minimum upper sub-surface height $H_U$ fulfills the condition: $0.35H_I \leq H_U \leq 0.85H_I$ and most preferably $0.40H_I \leq H_U \leq 0.60H_I$.

The upper sub-surface can comprise at least one overhanging portion, preferably extending around the entire periphery of the insert.

Preferably, except for a portion of the peripheral surface adjacent each secondary edge, the remainder of the peripheral surface adjacent to the cutting edge is parallel with the insert axis.

Preferably, a relief recess is formed under a portion of each secondary sub-edge.

In a bottom view parallel to the insert axis $A_I$, the first, second, third, fourth, fifth and sixth side abutment surfaces are spaced unequally from the adjacent cutting edge portions. A largest spacing of an abutment surface from an adjacent cutting edge portion can be located adjacent to a main sub-edge. A smallest spacing of an abutment surface from an adjacent cutting edge portion can be located adjacent to a secondary sub-edge.

The cutting insert can preferably be 120° rotationally symmetric about the insert axis. Stated differently, the cutting insert can have three identical sides.

The cutting insert can comprise three identically sized main sub-edges and three identically sized secondary sub-edges.

According to one preferred example, each main sub-edge has an edge length $L_M$ which fulfills the condition: $1.8$ mm$<L_M<2.8$ mm.

Most preferably, the base bearing surface is ground. In an embodiment, only the base bearing surface of the cutting insert is ground. This is most economical for production of the insert. It will be understood that in all cases it is advantageous when the lower sub-surface is unground.

In an embodiment in which it is necessary to carry out an additional rake surface grinding operation, the base bearing surface and the entire cutting edge are ground. Stated differently, the grinding operation is not conducted on the entire peripheral surface, but merely along the top of the insert and therefore the entire edge is contained within (i.e., lies on) a plane. It will be understood that such top grinding of the insert allows a multitude of inserts to be ground in a single pass.

It is also possible to produce a cutting edge which lies on a plane parallel to the base bearing surface, i.e., is planar in a side view of the insert. As known to those skilled in the art, it is more economical to grind a planar cutting edge, than one which is three-dimensional and does not lay on a plane.

In order to provide suitable performance, a cutting edge land width $W_L$ measurable perpendicular to the insert axis taken at any position along the cutting edge fulfills the condition: $W_L \leq 0.14$ mm. Preferably the land width $W_L$ fulfills the condition: $0.02$ mm$\leq W_L \leq 0.14$ mm, or even more preferably $0.03$ mm$\leq W_L \leq 0.11$ mm, and most preferably $0.04$ mm$\leq W_L \leq 0.08$ mm.

According to a sixth aspect of the present invention, there is provided a single-sided three-way indexable cutting insert having a positive basic shape and comprising: a rake surface; a base bearing surface located opposite the rake surface; a screw hole opening out to the rake and base bearing surfaces, the screw hole, the screw hole extending along an insert axis ($A_I$) which extends perpendicular to the base bearing surface and through a center of the insert, the insert axis defining an upward direction from the base bearing surface towards the rake surface, a downward direction opposite to the upward direction, and an outward direction perpendicular to the upward and downward directions and extending away from the insert axis; a peripheral surface connecting the rake surface and base bearing surface, the peripheral surface comprising: an upper sub-surface adjacent the rake surface and comprising an overhanging portion; and a lower subsurface between the upper sub-surface and the base bearing surface, the lower subsurface comprising six side abutment surfaces; and a cutting edge formed along an intersection of the peripheral surface and the rake surface, the cutting edge comprising three main sub-edges alternating with three secondary sub-edges, and a corner sub-edge located each main and secondary sub-edge and forming an obtuse internal angle: wherein: each secondary sub-edge comprises a first edge portion adjacent to one corner sub-edge and a second edge portion extending from the first edge portion in the direction of an adjacent corner sub-edge; the overhanging portion of the upper sub-surface comprises a non-relieved surface below the first edge portion and a relief recess below the second edge portion; and the relief recess has a step shape in a direction along said each secondary sub-edge.

The cutting insert can comprise six identical side abutment surfaces.

The base bearing surface can form an internal right angle ($\beta 1$) with each of six side abutment surfaces formed on a lower sub-surface.

The entire cutting edge can lie on a plane.

The cutting insert can further be defined as follows: a material volume ($V_F$) defined by the amount of material of the cutting insert; a cutting insert height ($H_I$) measurable parallel to the insert axis, from the base bearing surface to a highest point of the rake surface; the cutting edge, in a top view parallel to the insert axis ($A_I$), defines an edge inscribed circle ($C_M$) having an edge inscribed diameter ($D_M$), and an imaginary edge circumscribed circle ($C_E$) having an edge circumscribed diameter ($D_E$); and each main sub-edge has a main sub-edge length ($L_M$) which includes one-half the lengths of the corner edges adjacent thereto; each secondary sub-edge having a secondary sub-edge length ($L_S$) which includes one-half the lengths of the corner edges adjacent thereto; the base bearing surface defines, in a bottom view parallel to the insert axis ($A_I$), an imaginary base circumscribed circle ($C_B$) having a base diameter ($D_B$); the screw hole comprises: a screw hole bottom at an intersection with the base bearing surface; a screw hole top at an intersection with the rake surface; a void volume ($V_S$) calculated as the volume of a void extending from the screw hole bottom to the screw hole top; and a hole circle ($C_S$) defined, in a view parallel to the insert axis ($A_I$), at an intersection of the rake surface and the screw hole, the hole circle ($C_S$) having a hole diameter ($D_S$); the base circumscribed diameter ($D_B$) is smaller than the edge circumscribed diameter ($D_E$); and a volume ratio of the void volume ($V_S$) to the material volume ($V_F$) fulfills the condition: $V_S/V_F \geq 0.30$.

According to a seventh aspect of the present invention there is provided a tool holder comprising: two pockets comprising a seat abutment surface; a threaded pocket hole opening out to the seat abutment surface; and first, second and third lateral abutment surfaces which are straight and oriented perpendicular to the seat abutment surface; each first lateral abutment surface is located adjacent to the tool periphery and extends in an outward and forward direction; each second lateral abutment surface is closer to the rotation axis than the first lateral abutment surface and is separated from the first lateral abutment surface by a first relief recess, the second lateral abutment surface extends in an inward and forward direction; each third lateral abutment surface is closer to the rotation axis and more forwardly located than the second lateral abutment surface, and is separated from the second lateral abutment surface by a second relief recess, the third lateral abutment surface extends in an inward and forward direction; and the tool diameter $D_T$ fulfills the condition $D_T < 11$ mm.

According to an eighth aspect of the present invention there is provided a tool holder comprising: a rear end; a front end; a tool periphery extending from the rear end to the front end; a rotation axis extending through a center of the tool holder, the rotation axis defining a forward direction extending from the rear end to the front end, a rearward direction opposite to the forward direction, an outward direction perpendicular to the rotation axis and directed from the rotation axis to the tool periphery, and an inward direction opposite to the outward direction; a shank portion extending forward of the rear end; and a cutting portion extending forward of the shank portion to the front end, the cutting portion having a tool diameter ($D_T$) at the front end and exactly two circumferentially spaced flutes extending rearwardly from at an intersection of the front end and the tool periphery; each of the flutes comprising a pocket formed at the intersection of the front end and the tool periphery; each of the two pockets comprising: a seat abutment surface; a threaded pocket hole opening out to the seat abutment surface; and first, second and third lateral abutment surfaces which are transverse to the seat abutment surface; wherein each first lateral abutment surface is located adjacent to the tool periphery and extends in the outward and forward directions; each second lateral abutment surface is closer to the rotation axis than the first lateral abutment surface and is separated from the first lateral abutment surface by a first relief recess, each second lateral abutment surface extending in the inward and forward directions; each third lateral abutment surface is closer to the rotation axis and more forwardly located than the second lateral abutment surface, and is separated from the second lateral abutment surface by a second relief recess, each third lateral abutment surface extending in the inward and forward directions; and the tool diameter ($D_T$) fulfilling the condition $D_T < 11$ mm.

It is not believed that tool holders for such small diameters have been produced (with two pockets opening out partially in the radial direction increasing instability of a front end of the tool holder during a milling operation, and configured for receiving a relatively wide three-way indexable insert).

It will further be noted that the tool holders of the present invention relate only to pockets at the front end of the tool holder.

Preferably, the second and third lateral abutment surfaces, in a plan view of the seat abutment surface, are not parallel to each other.

Preferably, each flute comprises only a single pocket.

Preferably, a tool holder comprises a support web extending between the two pockets to a forwardmost point which is recessed from the front end of the tool holder.

It will be understood that with such small diameter tool holders, each element adding constructional strength is significant. Given the proximity of the inserts, a support web could not be added between them without being at risk of damage. A compromise was made in the form of a limited size support web which does not extend all the way to the front end of the tool.

Preferably, the support web has a thin elongated shape.

Preferably, a central portion of a forwardmost surface of the support web is planar.

Preferably, in a side view of the tool holder, a forwardmost surface of the support web is concavely shaped.

Preferably, the third lateral abutment surface is at least partially formed on the support web.

Preferably, the tool diameter $D_T$ is as small as possible to compete with solid end mills. With the features described above, a tool diameter $D_T$ fulfilling the condition $D_T$<10 mm has been successfully tested. It will be understood that the tool diameter which is measured at the front end of the tool holder is slightly smaller than the cutting tool diameter $D_C$. An approximated minimum tool diameter is theoretically, believed to fulfill the condition $D_T$>9 mm.

Yet another measure taken to accommodate two inserts in such small diameter has been to adjust their position relative to each other. While it is typically preferred for both inserts to have their rake surfaces generally aligned, in the case of a small diameter tool holder, this is not possible (e.g. since the inserts would touch). The preferred solution of the present invention is to align the inserts so a portion of the peripheral surface of each insert is adjacent to the other insert. With regard to this feature, it can also be described, for example, in relation to the pockets of the tool holder as follows.

In a view of the front end which is parallel to the rotation axis $A_R$: a first imaginary extension line extending from a front edge of one of the seat abutment surfaces can be parallel to a second imaginary extension line extending from a front edge of the other seat abutment surface; a central tool plane $P_C$ is defined parallel to the rotation axis $A_R$, and located between the first and second extension lines such that each seat abutment surface faces the central tool plane $P_C$; a first seat distance $D_{S1}$ is defined from the first extension line to the central tool plane $P_C$; a second seat distance $D_{S2}$ is defined from the second extension line to the central tool plane $P_C$; wherein a total distance $D_{S3}$ which is a sum of the first seat distance $D_{S1}$ and the second seat distance $D_{S2}$ fulfills the condition: $D_{S3}$<0.35$D_T$. Preferably, the total distance $D_{S3}$ fulfills the condition: $D_{S3}$<0.30$D_T$. A minimum dimension is preferably $D_{S3}$>0.20$D_T$.

Preferably, each pocket is identically formed and oriented in the tool holder.

Preferably, a pocket hole can similarly be comparatively large in cross section compared with the distance to the lateral abutment surfaces. This can be seen from a pocket hole diameter and distances to the lateral surfaces and understood given the dimensions of the present invention.

The screw axis can preferably be offset from the center of the seat abutment surface, i.e. slightly more proximate to where the first and second lateral abutment surfaces are closest to each other, so that a screw holding the cutting insert to the pocket will bias the cutting insert towards the first and second lateral abutment surfaces.

According to a ninth aspect of the present invention there is provided a tool holder comprising: a rear end; a front end; a tool periphery extending from the rear end to the front end; a rotation axis extending through the center of the tool holder and defining a forward direction extending from the rear end to the front end, a rearward direction opposite to the forward direction, and an outward direction perpendicular to the rotation axis and directed from the rotation axis to the tool periphery; a shank portion extending forward of the rear end; and a cutting portion extending forward of the shank portion to the front end, the cutting portion having a tool diameter $D_T$ at the front end and exactly two circumferentially spaced flutes extending rearwardly from at an intersection of the front end and the tool periphery; each of the flutes comprises a single pocket formed at the intersection of the front end and the tool periphery; wherein a support web extends between the pockets to a forwardmost point which is recessed from the front end of the tool holder.

According to a tenth aspect of the present invention there is provided an insert mill comprising a tool holder according to one of the seventh to ninth aspects and at least one insert according to any one of the first to sixth aspects mounted thereto.

According to an eleventh aspect of the present invention there is provided an insert mill comprising: a tool holder according to any one of the above aspects; and a cutting insert according to any one of the above aspects and which cutting insert is mounted in one of the pockets of the tool holder; exactly one of the insert's main sub-edges extends forward of the tool holder; exactly one of the insert's secondary sub-edges extends forward of the tool holder; exactly one of the insert's secondary sub-edges extends outward of the tool periphery.

According to a twelfth aspect of the present invention there is provided an insert mill comprising: two cutting inserts and a tool holder; the tool holder comprising: a rear end; a front end; a tool periphery extending from the rear end to the front end; a rotation axis extending through the center of the tool holder and defining a forward direction extending from the rear end to the front end, a rearward direction opposite to the forward direction, and an outward direction perpendicular to the rotation axis and directed from the rotation axis to the tool periphery; a shank portion extending forward of the rear end; and a cutting portion extending forward of the shank portion to the front end, the cutting portion having a tool diameter $D_T$ at the front end and exactly two circumferentially spaced flutes extending rearwardly from at an intersection of the front end and the tool periphery; each of the flutes comprises a single pocket formed at the intersection of the front end and the tool periphery, each pocket having a cutting insert mounted therein, each pocket opening out in the outward direction such that a main sub-edge of each cutting insert extends in a forward direction past the tool holder's front end, the cutting insert extension in the outward direction further defining a cutting tool diameter $D_C$; each of the cutting inserts comprising an identical cutting edge formed along an intersection of a peripheral surface a rake surface thereof; each cutting edge defining, in a view parallel to an insert axis $A_I$, an imaginary edge circumscribed circle $C_E$ having an edge circumscribed diameter $D_E$; wherein an insert mill ratio $R_{IM}$ defined as $(D_E+D_E)/D_C$ fulfills the condition: $R_{IM}$>0.9.

Preferably, the insert mill ratio $R_{IM}$ fulfills the condition: $R_{IM}$>1.0. A maximum dimension is preferably $D_{S3}$<1.4, preferably $D_{S3}$<1.2.

Preferably, in a view of the front end which is parallel to the rotation axis $A_R$, each insert's peripheral surface is adjacent a portion of the other insert's peripheral portion.

Preferably, a total distance $D_{S3}$ is greater than the cutting insert height $H_I$.

BRIEF DESCRIPTION OF THE DRAWINGS

For a better understanding of the subject matter of the present invention, and to show how the same may be carried out in practice, reference will now be made to the accompanying drawings derived from a scale model, in which.

DETAILED DESCRIPTION

Figure 1A:
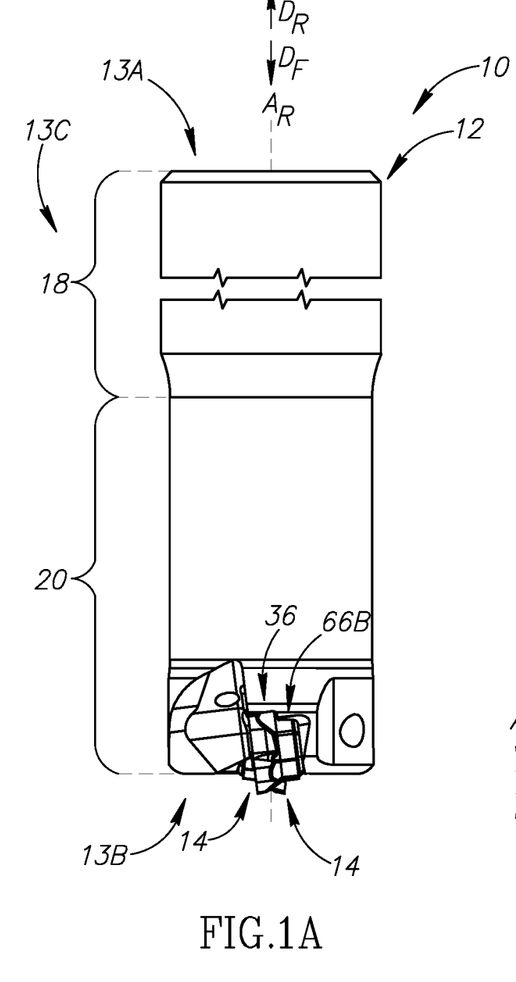
FIG. 1A is a side view of an insert mill comprising a tool holder and inserts according to the subject matter of the present invention, rotated to show a side view of one of the inserts.
Figure 1B:
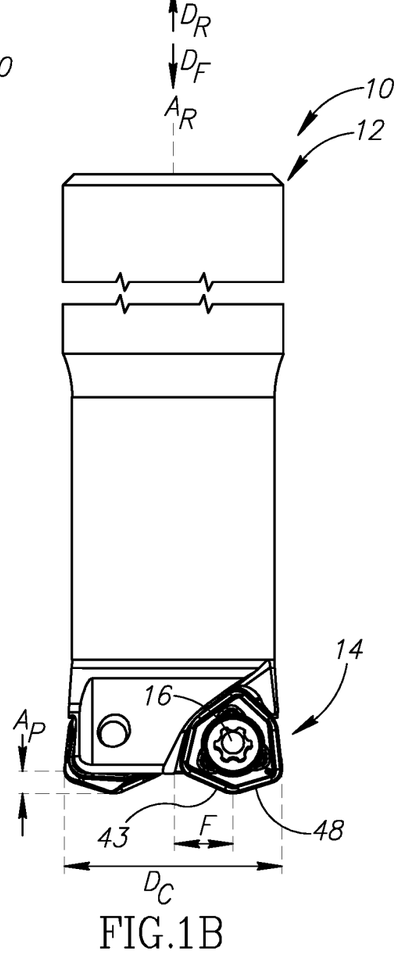
FIG. 1B is a side view of the insert mill in FIG. 1A, rotated to show a front view of one of the inserts.
Figure 1C:
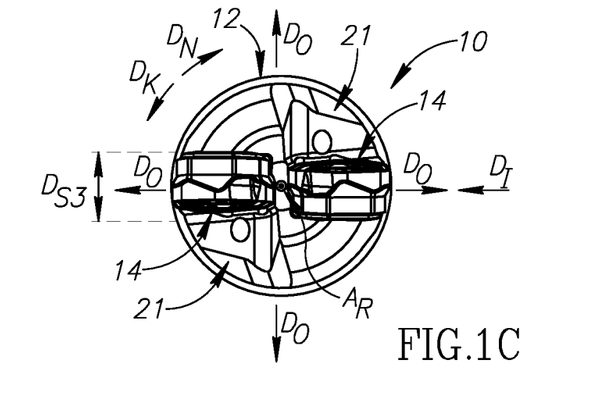
FIG. 1C is a front end view of the insert mill in FIG. 1B.

FIGS. 1A to 1C illustrates an insert mill 10 configured for feed milling operations.

The insert mill 10 comprises a tool holder 12, cutting inserts 14 and screws 16 for securing the cutting inserts 14 to the tool holder 12.

The insert mill 10 is configured for rotating about a rotation axis $A_R$ which extends longitudinally through the center thereof.

The rotation axis $A_R$ defines opposite axially forward and rearward directions $D_F$, $D_R$, and opposite rotational cutting and non-cutting directions $D_K$, $D_N$.

The tool holder 12 comprises a rear end 13A, a front end 13B and a tool periphery 13C extending therebetween.

The tool holder 12 further comprises a shank portion 18 and a cutting portion 20 extending forward therefrom.

The cutting portion 20 comprises exactly two flutes 21. Each flute 21 comprises a pocket 22 (see FIG. 8A) formed at the intersection of the front end 13B and the tool periphery 13C.

The cutting inserts 14, screws 16 and pockets 22, in the examples given, are identical therefore features described with respect to one should be considered to apply to all.

The cutting insert 14 will now be described with reference to FIGS. 2-6.

Figure 2:
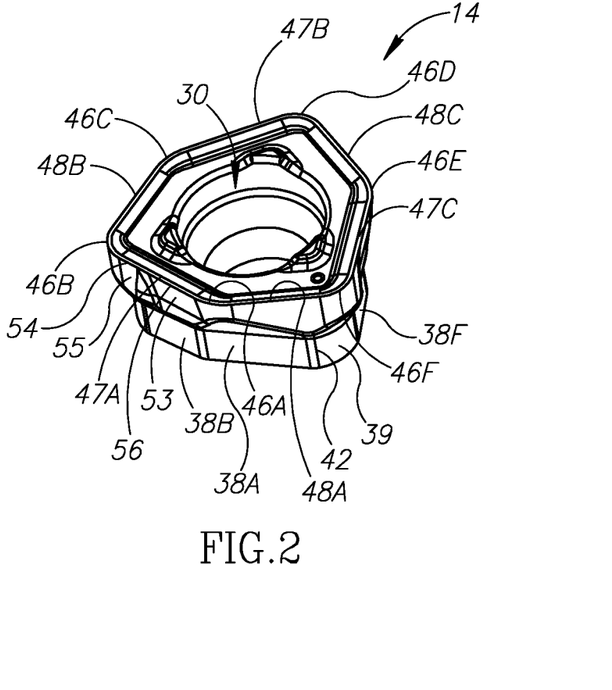
FIG. 2 is a perspective view of one of the inserts shown in FIG. 1A.

The cutting insert 14 is a single-sided three-way indexable cutting insert having a positive basic shape. It comprises a rake surface 24, a base bearing surface 26, a peripheral surface 28, a screw hole 30, and a cutting edge 32.

An insert axis $A_I$ (FIG. 6) extends perpendicular to the base bearing surface 26 and through the center of the insert 14. The insert axis $A_I$ is provided to assist defining directions and features of the cutting insert 14. Generally speaking, while it is most preferred that a screw hole of the present invention is located in the center of an insert and is perpendicular to a base bearing surface, resulting in an insert axis of the insert also extending through the center the screw hole, it will be understood that it is possible a screw hole can be slanted or not perfectly central to a cutting insert, resulting in a screw hole axis (not shown) which is not coaxial with the insert axis $A_I$ (whereas in the present preferred example they are coaxial). Nonetheless, given that the present invention seeks to minimize material usage to the greatest extent possible, certainly for the purposes of structural strength the exemplified central and perpendicular screw hole is preferred. Therefore in the given example the insert axis $A_I$ also extends through the center of the screw hole 30.

Figure 5A:
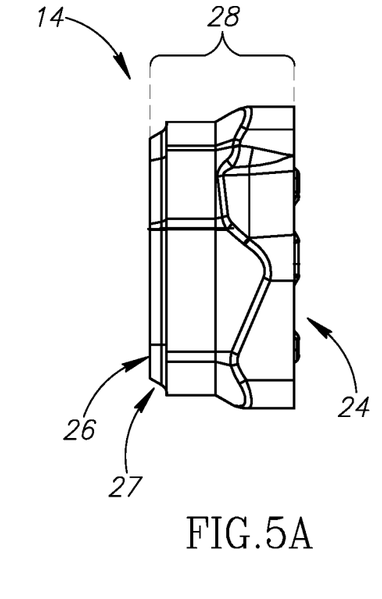
FIG. 5A is a side view of the insert in FIG. 2.
Figure 5B:
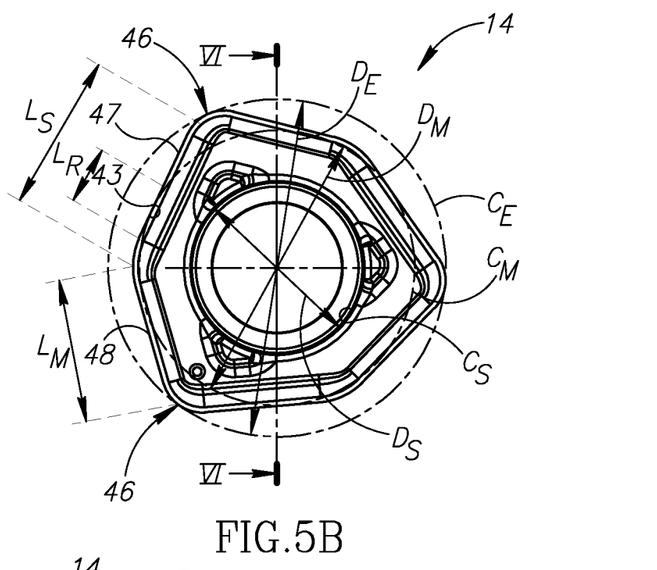
FIG. 5B is a top view of the insert in FIG. 5A.
Figures 5C, 6:
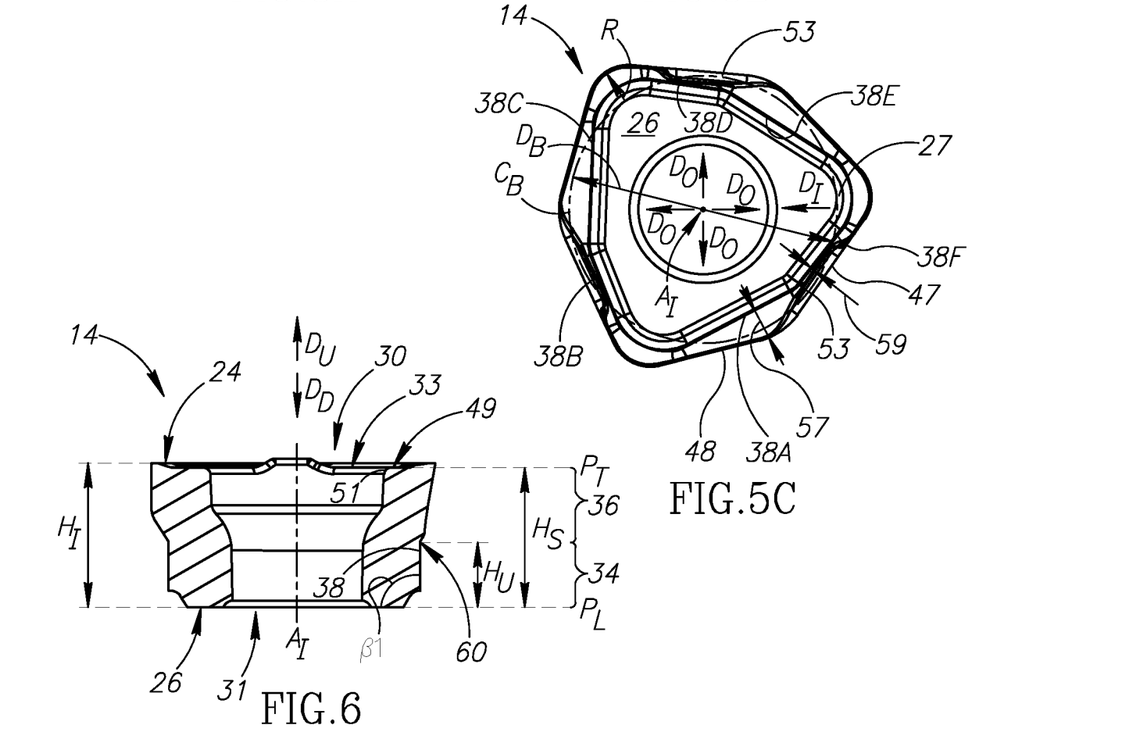
FIG. 5C is a bottom view of the insert in FIG. 5A.
FIG. 6 is a cross-section view taken along line VI-VI in FIG. 5B.

Referring to FIG. 6, the screw hole 30 can comprise a screw hole bottom 31 and a screw hole top 33.

In FIG. 5B, a hole circle $C_S$ is shown defining a hole diameter $D_S$.

The insert axis $A_I$ defines opposite upward and downward directions $D_U$, $D_D$, and, as exemplified in FIG. 5C, opposite inward and outward directions $D_I$, $D_O$. The outward direction $D_O$ is not meant to define one specific direction but rather all possible 360° outward directions from the insert axis $A_I$, four such directions being exemplified. This is also true, in the opposite direction, for the inward direction $D_I$, even though only one example is shown. This is also true for the inward and outward directions $D_I$, $D_O$ shown regarding the insert mill 10 in FIG. 1C.

As shown, for example in FIGS. 4A to 4C and 6, the rake surface 24 can preferably slope inwardly and downwardly from the cutting edge 32 to form an acute internal angle α for chip forming purposes. The acute internal angle α formed between the rake surface 24 and the peripheral surface 28 is also referred to as a positive rake angle. Such positive angle compensates for the orientation of the seat abutment surfaces, which in this non-limiting but preferred example, extend slanted to the rotation axis $A_R$ and do not provide a positive cutting angle themselves.

The base bearing surface 26 is generally planar as shown, but it will be understood that this definition does not preclude the possible inclusion of a small rounded transition edge between the peripheral surface 28 and the base bearing surface 26, as shown for example in FIG. 7 of EP 3050655. In the shown embodiment, a chamfer 27 (FIGS. 5A and 5C) is provided. For the purposes of the specification and claims, the base bearing surface 26 is considered to be the lowest surface, i.e. not including any chamfered or rounded area. Thus, in FIG. 5C, the base bearing surface 26 defines, in a view parallel to the insert axis $A_I$, an imaginary base circumscribed circle $C_B$ having a base diameter $D_B$.

Referring to FIG. 5C, the positive basic shape of the cutting insert 14 means that the base bearing surface 26 has a smaller base diameter $D_B$ than a circumscribing diameter $D_E$ of the cutting edges 32 (FIG. 5B).

Referring to FIGS. 2, 5C and 6, the peripheral surface 28 comprises a lower sub-surface 34 and an upper sub-surface 36. The lowermost portion of the lower sub-surface 34 comprises a chamfer 27. The chamfer 27 connects the base bearing surface 26 to a remainder of the lower sub-surface 34 which extends parallel to the insert axis $A_I$, the remainder being located between the chamfer 27 and the upper sub-surface 36. The lower sub-surface 34 is unground and extends upwardly from the base bearing surface 26, and comprises first, second, third, fourth, fifth and sixth side abutment surfaces 38A, 38B, 38C, 38D, 38E, 38F, which are located on the aforementioned remainder and thus also are parallel to the insert axis $A_I$. (Hereinafter the identical side abutment surfaces will be identified generally as "side abutment surface(s) 38"). Radius portions 39 (FIG. 2) extend between the side abutment surfaces 38 but have no abutment function in the example shown.

It will be noted that the insert's abutment surfaces 38 serve as bearing surfaces which form an internal right angle β1 with the base bearing surface 26, as best seen in FIG. 6.

Figure 3:
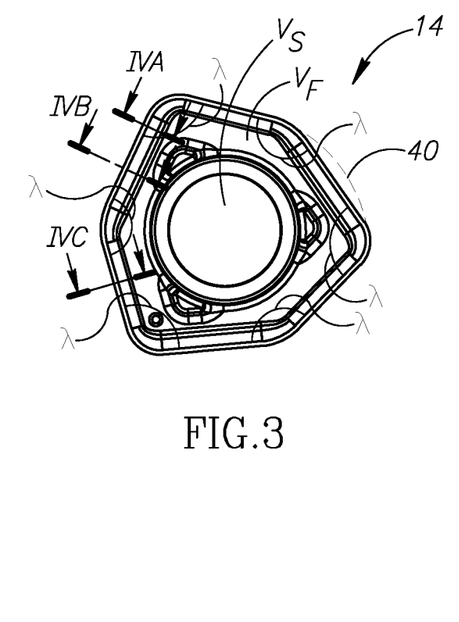
FIG. 3 is a top view of the insert in FIG. 2.

Each of the side abutment surfaces 38 is generally planar. To elaborate, an exaggerated schematic convex bulge 40 is shown in FIG. 3. The bulge 40 typically results from a sintering process. Since the inserts of the present invention are small, distortion resulting in such bulge 40 is acceptably small enough for them not to require grinding. Generally speaking, such convexity or concavity (not shown; which can be considered an inward "bulge" for the purposes of the specification) is measured as a maximum distance from a plane connecting adjacent corners of an insert to such bulge.

Thus, the insert is stated to have an unground lower sub-surface. Even though in FIG. 2, for example, the unground lower sub-surface appears to have a discontinuity line 42, this is merely a result of this particular drawing showing a curvature line. An actual product which has not been ground does not have a discernable line, and smoothly transitions from the generally planar portion to the radius portion 39.

Figure 4A:
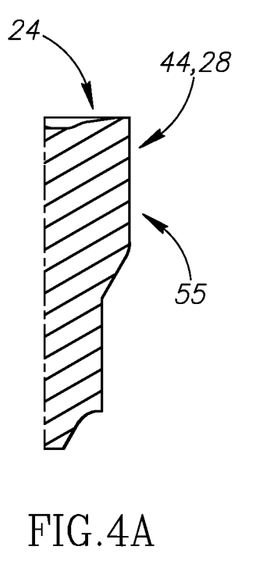
FIG. 4A is a cross-section view taken along line IVA in FIG. 3.
Figure 4B:
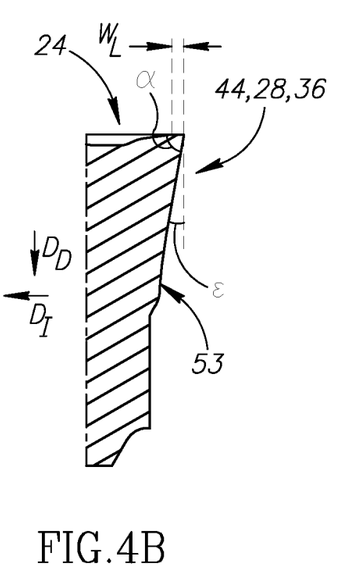
FIG. 4B is a cross-section view taken along line IVB in FIG. 3.
Figure 4C:
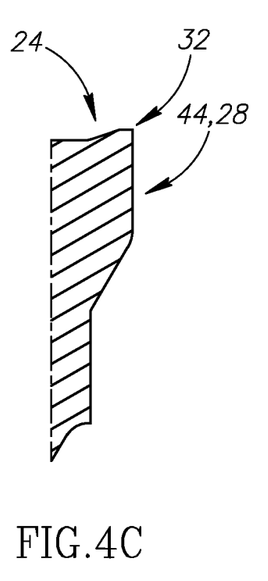
FIG. 4C is a cross-section view taken along line IVC in FIG. 3.

The upper sub-surface 36 comprises an overhanging portion 44 extending in this example around the entire insert 14 (exemplified in FIGS. 4A to 4C).

Referring to FIG. 2, the cutting insert 14 can comprise six corner edges 46A, 46B, 46C, 46D, 46E, 46F (hereinafter generally referred to as "corner edge(s) 46"), and three identical main sub-edges 48A, 48B, 48C (hereinafter generally referred to as "main sub-edge(s) 48"), and three identical secondary sub-edges 47A, 47B, 47C (hereinafter generally referred to as "secondary sub-edge(s) 47").

Referring to FIG. 5B, in connection with the cutting edge 32, there is shown an imaginary edge circumscribed circle $C_E$ having an edge circumscribed diameter $D_E$, and an imaginary edge inscribed circle $C_M$ having an edge inscribed diameter $D_M$. The edge circumscribed circle $C_E$ is the smallest diameter circle which encloses all portions of the circumferentially extending cutting edge 32, while the edge inscribed circle $C_M$ is the largest diameter circle that fits entirely within the circumferentially extending cutting edge. 32

Dimensions of various features are shown as follows: each corner sub-edge 46 can have a radius R (FIG. 5C); and each main sub-edge 48 can have a main sub-edge length $L_M$ measured from the center of the bordering corner sub-edges 46, the main sub-edge length $L_M$ being the actual dimension usable during a feed operation. Furthermore, each secondary sub-edge 47 (measured from the center of the bordering corner sub-edges 46) can have a secondary edge length $L_S$; each ramping portion 43 of a secondary sub-edge 47, i.e. the portion thereof having a relieved peripheral surface portion thereunder, i.e. a relief recess 53 thereunder, can have an effective ramp edge length $L_R$; and a cutting edge land width $W_L$ is shown in FIG. 4B.

Referring to FIG. 6, a void volume $V_S$ of the cutting insert 14 is defined by the boundaries of the screw hole 30.

Specifically, a screw hole height $H_S$ is defined from the base bearing surface 26 to an upper edge 49 of the screw hole 30 (also designated in FIG. 4). Stated differently, the void volume $V_S$ is calculated as the volume of the void extending from a bottom of the screw hole 30, defined at a lower plane $P_L$ perpendicular to the insert axis $A_I$, to a top of the screw hole 30, defined at an upper plane $P_T$ a perpendicular to the intersection of the screw hole 30 and the rake surface 24, i.e. at the height of the upper edge 49. More precisely, the upper edge 49 is an intersection of a curved corner 51 and the rake surface 24.

The material volume $V_F$ is the volume of the actual material of which the cutting insert 14 is made.

Each side abutment surface 38 extends, preferably, upwardly from the base bearing surface 26 at a right angle 131 shown in FIG. 6.

A cutting insert height $H_I$ extends from the base bearing surface 26 to a highest point of the rake surface 24 (noting the cutting edge is a part of the rake surface 24).

The overhanging portion 44 has a lowermost point 60 (FIG. 6) at the minimum upper sub-surface height $H_U$ above the base bearing surface 26.

The upper sub-surface 36 (FIG. 6A) begins, in the upward direction, at the minimum upper sub-surface height $H_U$ above the base bearing surface 26, the minimum upper sub-surface height $H_U$ being measurable parallel to the insert axis $A_I$.

As seen in FIG. 2, the secondary sub-edge 47A has a first edge portion 54 adjacent to one corner sub-edge 46B and a second edge portion 56 which extends from the first edge portion 54 in the direction of the adjacent corner sub-edge 46A. Referring to FIGS. 2, 4A and 4B, a relief recess 53 is formed under the second edge portion 56 of each secondary sub-edge 47. The relief recess 53 is as short as possible in a direction along (underneath) the secondary sub-edge 47 to provide the desired ramping function capability without weakening adjacent portions of the cutting edge. For example, under the first portion 54 of the secondary sub-edge 47A, there is no relief at the overhanging portion 44, as shown in FIGS. 2 and 4A. This results in a vertically extending, planar non-relieved surface 55 which extends below and along the first edge portion 54. In contrast, below the second edge portion 56 of the secondary sub-edge 47A, the overhanging portion 44 is inwardly sloped in the direction of the base bearing surface 26, thereby forming the relief recess 53 below and along the second edge portion 56, as shown in FIGS. 2 and 4B. Stated differently, the relief recess 53 could be described as having a step shape in the direction along the secondary sub-edge 47.

The step shape allows the remainder of the cutting edge to be strong. Alternatively, a gradually relieved shape in the direction along the second sub-edge 47 could be used.

FIG. 4B shows a relief angle E. Notably, the other surfaces adjacent to the rake surface 24 in section views 4A and 4C are perpendicular thereto, thus providing preferred stronger cutting edge support.

Referring to FIG. 5C, a largest spacing 57 of an abutment surface from an adjacent cutting edge portion is shown adjacent to a main sub-edge 48. A smallest spacing 59 is shown adjacent to a secondary sub-edge 47. More particularly adjacent to a relief recess 53.

Referring now to FIGS. 7A to 8C, the pocket 22 comprises a seat abutment surface 62, a threaded pocket hole 64 opening out to the seat abutment surface 62 and defining a minimal pocket hole inscribed circle $I_P$ and an associated minimal pocket hole diameter $D_P$, first, second and third lateral abutment surfaces 66A, 66B, 66C (referred to collectively as "lateral abutment surfaces 66") perpendicular to the seat abutment surface 62 are shown.

Between the lateral abutment surfaces 66 are first and second lateral recesses 67A, 67B (referred to collectively as "lateral recesses 67"). The use of lateral recesses 67 helps define contact points of the insert 14 and the pocket 22. Notably the contact points are shown with hatch lines in FIG. 8A.

Figure 8A:
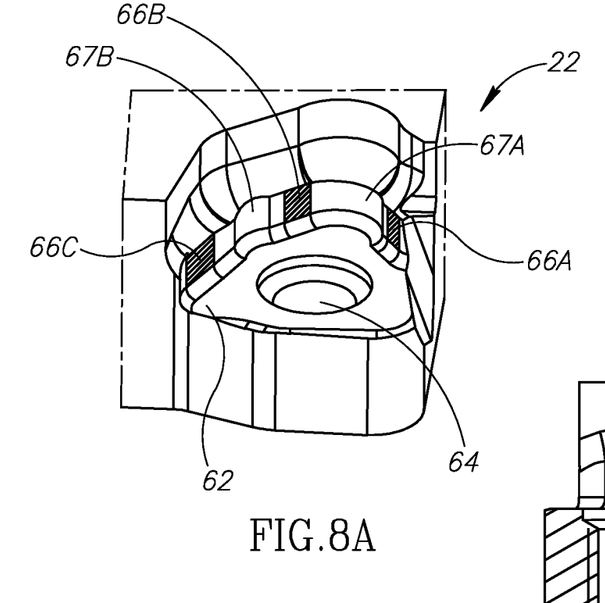
FIG. 8A is a perspective view of a pocket of the tool holder in FIG. 7A.
Figure 8B:
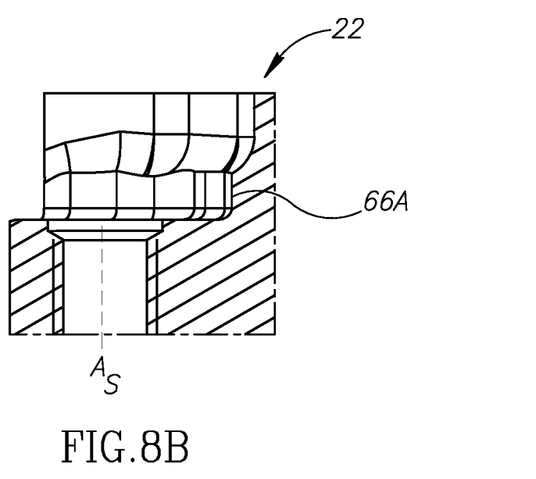
FIG. 8B is a side view of the pocket in FIG. 8A.
Figure 8C:
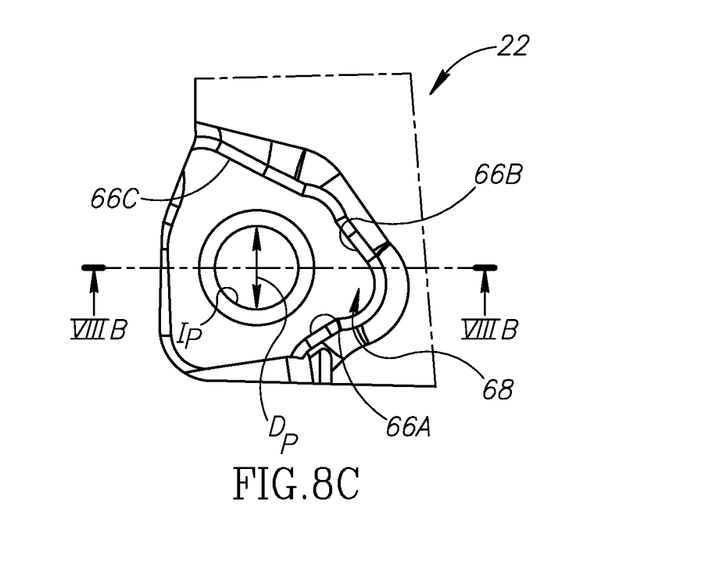
FIG. 8C is a top (i.e. axial) view of the pocket in FIG. 8A, and also constitutes a plan view of the seat abutment surface of the pocket.

The pocket hole 64 can similarly be comparatively large in cross section compared with the distance to the lateral abutment surfaces. This can be seen from the pocket hole diameter $D_P$ and the distances from the pocket hole 64 to the lateral abutment surfaces 66.

The first, second and third lateral abutment surfaces 66A, 66B, 66C are preferably oriented at the same orthogonal internal angle 131 as the insert's abutment surfaces 38.

A screw axis $A_S$ can preferably be offset from a center of the seat abutment surface 62, i.e. slightly more proximate to where the lateral abutment surfaces 66 are closest to each other (i.e. the area generally designated 68) so that a screw holding the cutting insert to the pocket 22 will bias the cutting insert towards the lateral surfaces.

Figure 7A:
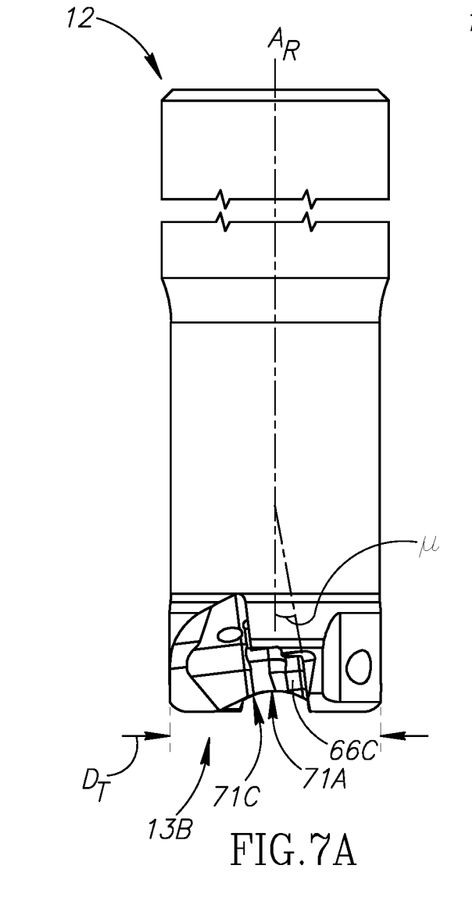
FIG. 7A is a side view of a tool holder of the insert mill shown in FIG. 1A, rotated to show a side view of one of the pockets.
Figure 7B:
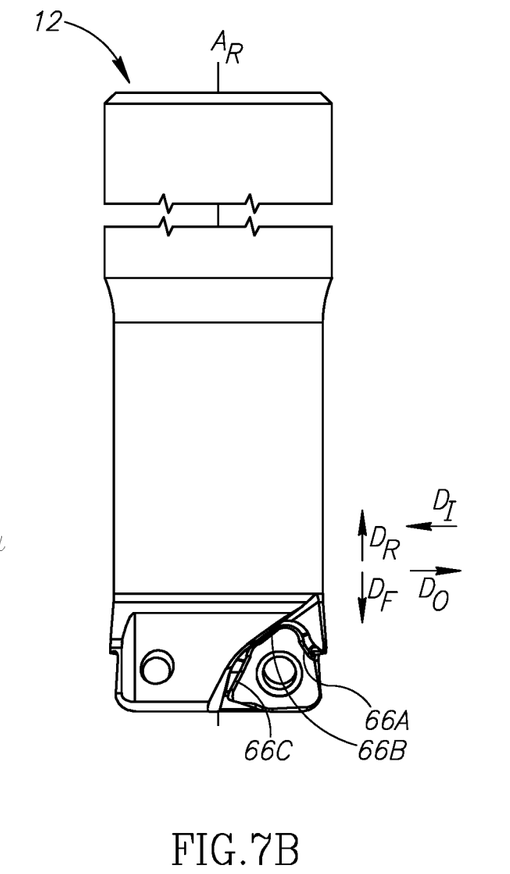
FIG. 7B is a side view of the tool holder in FIG. 7A, rotated to show a front view of one of the pockets.

As shown in FIG. 7A, the pocket is preferably slanted in the forward direction $D_F$ and cutting direction $D_C$ with respect to the rotation axis $A_R$, as shown by a pocket slant angle μ. The pocket slant angle μ can preferably fulfill the condition $2° \leq μ \leq 9°$, and more preferably $5° \leq μ \leq 8°$.

Figure 7C:
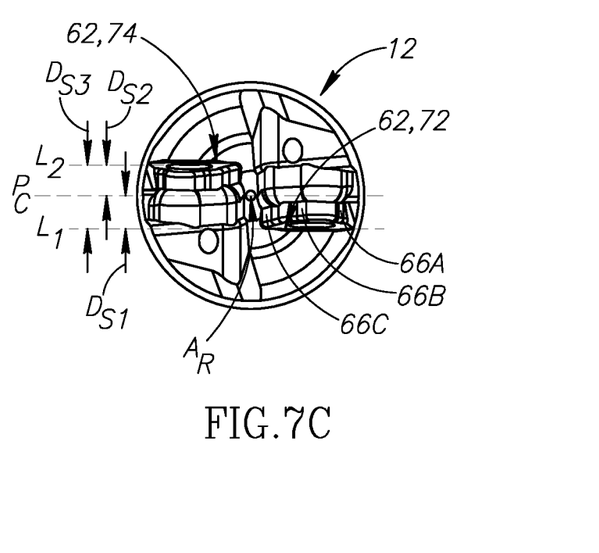
FIG. 7C is a front end view of the tool holder in FIG. 7A.

Referring to FIG. 7C, a first imaginary extension line $L_1$ extending from a front edge 72 of one of the seat abutment surfaces 62 can be parallel with a second imaginary extension line $L_2$ extending from a front edge 74 of the other seat abutment surface 62. A central tool plane $P_C$ contains the rotation axis $A_R$, and is located between, and parallel to, the first and second extension lines $L_1$, $L_2$ such that each seat abutment surface 62 faces the central tool plane $P_C$. A first seat distance $D_{S1}$ is defined from the first extension line $L_1$ to the central tool plane $P_C$. A second seat distance $D_{S2}$ is defined from the second extension line $L_2$ to the central tool plane $P_C$. A total distance $D_{S3}$ which is a sum of the first seat distance $D_{S1}$ and the second seat distance $D_{S2}$.

The total distance $D_{S3}$ can be alternatively defined relative to the insert. Referring to FIG. 1C, a total distance $D_{S3}$ is greater than the cutting insert height $H_1$ (only shown in FIG. 6 since in FIG. 1C the inserts are slanted). It will be understood that there is limited space given the dimensions. It will also be understood that if the inserts are positioned with their peripheral surfaces distant from each other instead of the present arrangement (i.e. if the insert on the right side of FIG. 7C would be moved towards the bottom of the page and the insert on the left side towards the top) then the tool holder structural strength for the pocket 22 will be weakened (as there is less material supporting the insert). Conversely, if the inserts 14 are moved in the opposite direction, there might be insufficient chip evacuation space in the flutes. Accordingly, the most preferred arrangement is with the peripheral surfaces adjacent each other.

Figure 9B:
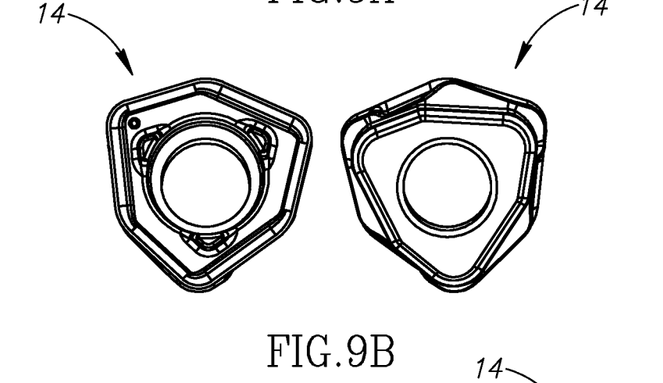
FIG. 9B is a side view of the inserts shown in FIG. 9A, also corresponding to the orientation of the inserts as shown in FIG. 1B.
Figure 9C:
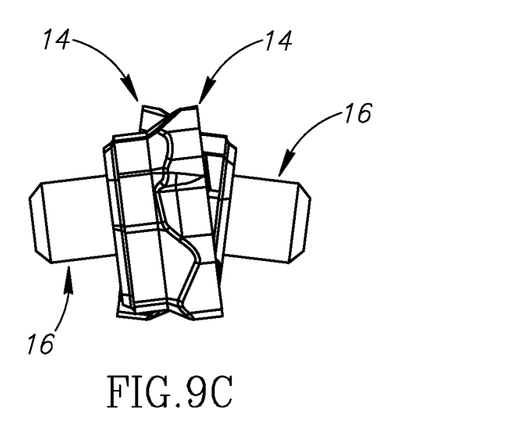
FIG. 9C is a side view of the inserts shown in FIG. 9B, and the screws for mounting same to the tool holder, rotated to correspond to the orientation of the inserts as shown in FIG. 1A.

Referring to FIGS. 9A and 9B, the latter showing the relative positions of the seated cutting inserts as in a front end view of the tool, the cutting inserts only have a small gap therebetween. To alleviate this they are provided positive basic shapes and their positioning as shown in FIG. 9A (i.e. the cutting edges are not adjacent and each insert's peripheral surface is adjacent a portion of the other insert's peripheral portion). Using such features is one way to mount relatively large inserts (relative to the tool holder diameter) in a relatively small circumscribing cutting diameter circle $C_C$. The ratio for these features is described above.

Figure 7D:
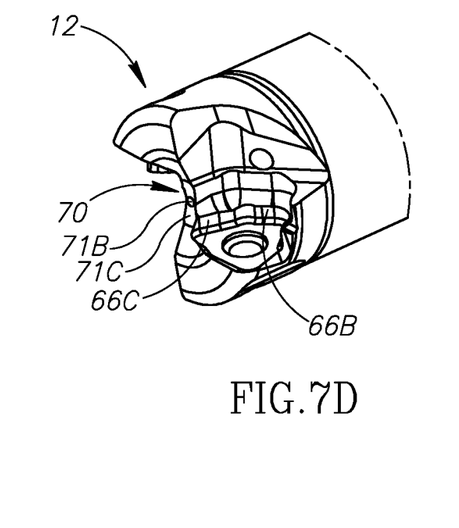
FIG. 7D is a perspective view of a portion of the tool holder in FIG. 7A.

Referring to FIGS. 7A and 7D, because of the proximity of the inserts 14, a limited length support web 70 is provided.

The support web 70 extends to a forwardmost point 71A (in the center thereof, also coinciding with the rotation axis $A_R$) which is recessed rearwardly from the front end 13B of the tool holder 12. It will be noted that the circle shape 71B shown merely indicates a planar surface. As shown in FIG. 7A, a forwardmost surface 71C is concavely shaped.

When mounted, the screw 16 secures the cutting insert 14 such that the base bearing surface 26 abuts the seat abutment surface 62 and three of the insert's abutment surfaces 38 abut the pocket's three lateral abutment surfaces 66. It will be understood that the cutting insert 14 can be repositioned three times in the pocket 22 and that the exact designation of which specific abutment surfaces contact at any given time is not important.

It is noted, for example from FIG. 1A, that the upper sub-surface 36 does not contact the tool holder 12 and therefore inserts with slightly different cutting edges can be mounted to the same tool holder 12.

In FIG. 1B, for feed operations the main cutting sub-edge 48 contacts a workpiece (not shown). The cut depth $A_P$ is relatively small compared to other types of milling operations.

Of note is that in this non-limiting example, the main cutting sub-edge 48 is spaced far away from the rotation axis $A_R$ (exemplified by the distance F). This is typically disadvantageous but allows the very small diameter insert mill an acceptable cutting width $A_E$.

For ramping operations, only the ramping portion 43 contacts the workpiece (the remainder of the secondary sub-edge 47 is not used).

What is claimed is:

1. A single-sided three-way indexable cutting insert having a positive basic shape and comprising:
    a material volume $V_F$ defined by the amount of material of the cutting insert;
    a rake surface;
    a base bearing surface located opposite the rake surface;
    an insert axis ($A_I$) extending perpendicular to the base bearing surface and through a center of the insert, the insert axis defining: an upward direction from the base bearing surface towards the rake surface, a downward direction opposite to the upward direction, and an outward direction perpendicular to the upward and downward directions and extending away from the insert axis;
    a cutting insert height ($H_I$) measurable parallel to the insert axis, from the base bearing surface to a highest point of the rake surface;
    a peripheral surface connecting the rake surface and base bearing surface;
    a cutting edge formed along an intersection of the peripheral surface and the rake surface, the cutting edge defining, in a top view parallel to the insert axis ($A_I$), an imaginary edge circumscribed circle ($C_E$) having an edge circumscribed diameter $D_E$; and
    a screw hole opening out to the rake and base bearing surfaces, the screw hole comprising:
        a screw hole bottom at an intersection with the base bearing surface;
        a screw hole top at an intersection with the rake surface;
        a void volume $V_s$ defined as the volume of a void extending from the screw hole bottom to the screw hole top; and a hole circle ($C_S$) defined, in said top view parallel to the insert axis ($A_I$), at an intersection of the rake surface and the screw hole, the hole circle ($C_S$) having a hole diameter $D_S$;

the base bearing surface defining, in a bottom view parallel to the insert axis ($A_I$), an imaginary base circumscribed circle ($C_B$) having a base diameter $D_B$;

the peripheral surface including an upper sub-surface adjacent the rake surface, the upper sub-surface comprising an overhanging portion;

the peripheral surface further including a lower sub-surface between the upper sub-surface and the base bearing surface, the lower sub-surface comprising six side abutment surfaces including first, second, third, fourth, fifth and sixth side abutment surfaces;

the cutting edge, in said top view parallel to the insert axis ($A_I$), defining an edge inscribed circle ($C_M$) having an edge inscribed diameter $D_M$, the cutting edge comprising:

exactly three main sub-edges and exactly three secondary sub-edges, the main sub-edges alternating with the secondary sub-edges with a corner sub-edge at each intersection between the main and secondary sub-edges;

each main sub-edge having a main sub-edge length $L_M$ which includes one-half the lengths of the corner sub-edges adjacent thereto, and each secondary sub-edge having a secondary sub-edge length $L_S$ which includes one-half the lengths of the corner sub-edges adjacent thereto;

wherein:

the lower sub-surface comprises a chamfer located between the base bearing surface and a remainder of the lower sub-surface, the remainder being located between the chamfer and the upper sub-surface;

the remainder of the lower sub-surface is parallel to the insert axis ($A_I$);

said six side abutment surfaces are formed on said remainder of the lower sub-surface, said six side abutment surfaces also being parallel to the insert axis ($A_I$);

the edge circumscribed diameter $D_E$ fulfills the condition: $D_E < 6$ mm;

the base circumscribed diameter $D_B$ is smaller than the edge circumscribed diameter $D_E$;

a volume ratio $V_S/V_F$ of the void volume $V_S$ to the material volume $V_F$ fulfills the condition: $0.5 > V_S/V_F \geq 0.30$;

an insert thickness diameter ratio of the hole diameter $D_S$ to the edge inscribed diameter $D_M$ fulfills the condition: $0.80 > D_S/D_M > 0.60$; and an edge length ratio of the main sub-edge length $L_M$ to the secondary sub-edge length $L_S$ fulfills the condition: $L_M/L_S > 0.80$.

2. The cutting insert according to claim 1, wherein the volume ratio fulfills the condition: $V_S/V_F > 0.35$.

3. The cutting insert according to claim 1, wherein the edge length ratio fulfills the condition: $L_M/L_S > 1.0$.

4. The cutting insert according to claim 1, wherein an effective ramp edge length $L_R$ is a length of the secondary sub-edge measured adjacent a relieved peripheral surface portion and fulfills the condition: $0.4L_S > L_R > 0.8L_S$.

5. The cutting insert according to claim 1, wherein, in said top view parallel to the insert axis ($A_I$), all internal angles formed between the main and secondary sub-edges are obtuse.

6. The cutting insert according to claim 1, wherein the edge circumscribed diameter $D_E$ fulfills the condition: 6 mm > $D_E$ > 4 mm.

7. The cutting insert according to claim 1, wherein the base bearing surface is the only ground surface of the cutting insert.

8. The cutting insert according to claim 1, wherein the six side abutment surfaces are perpendicular to the base bearing surface.

9. The cutting insert according to claim 1, wherein a relief recess is formed under a portion of each secondary sub-edge.

10. The cutting insert according to claim 9, wherein in said bottom view parallel to the insert axis ($A_I$), a largest spacing between any of the six side abutment surfaces and an adjacent cutting edge portion is located adjacent to one of the three main sub-edges.

11. The cutting insert according to claim 10, wherein in said bottom view parallel to the insert axis ($A_I$), a smallest spacing between any of the six side abutment surfaces and an adjacent cutting edge portion is located adjacent to one of the secondary sub-edges.

12. An insert mill comprising:
a tool holder comprising:
a rear end;
a front end;
a tool periphery extending from the rear end to the front end;
a rotation axis extending through a center of the tool holder, the rotation axis defining a forward direction extending from the rear end to the front end, a rearward direction opposite to the forward direction, an outward direction perpendicular to the rotation axis and directed from the rotation axis to the tool periphery, and an inward direction opposite to the outward direction;
a shank portion extending forward of the rear end; and
a cutting portion extending forward of the shank portion to the front end, the cutting portion having a tool diameter $D_T$ at the front end and exactly two circumferentially spaced flutes extending rearwardly from an intersection of the front end and the tool periphery;
each of the flutes comprising a pocket formed at the intersection of the front end and the tool periphery; and
a cutting insert according to claim 1 mounted in one of the pockets of the tool holder;
wherein:
exactly one of the insert's main sub-edges extends forward of the tool holder;
exactly one of the insert's secondary sub-edges extends forward of the tool holder; and
exactly one of the insert's secondary sub-edges extends outward of the tool periphery.

13. The insert mill according to claim 12, wherein:
each of the pockets comprises:
a seat abutment surface;
a threaded pocket hole opening out to the seat abutment surface; and
first, second and third lateral abutment surfaces which are transverse to the seat abutment surface;
each first lateral abutment surface is located adjacent to the tool periphery and extends in the outward and forward directions;
each second lateral abutment surface is closer to the rotation axis than the first lateral abutment surface and is separated from the first lateral abutment surface by a first relief recess, each second lateral abutment surface extending in the inward and forward directions;

each third lateral abutment surface is closer to the rotation axis and more forwardly located than the second lateral abutment surface, and is separated from the second lateral abutment surface by a second relief recess, each third lateral abutment surface extending in the inward and forward directions; and the tool diameter $D_T$ fulfilling the condition $D_T<11$ mm.

14. The insert mill according to claim 13, wherein the second and third lateral abutment surfaces, in a plan view of the seat abutment surface, are not parallel to each other.

15. The insert mill according to claim 13, wherein a support web extends between the two pockets to a forwardmost point of the support web, which forwardmost point is recessed from the front end of the tool holder.

16. The insert mill according to claim 15, wherein the support web has an elongated shape.

17. The insert mill according to claim 15, wherein the support web has a forwardmost surface and: (a) a central portion of the forwardmost surface is planar; or (b) in a side view of the tool holder, the forwardmost surface is concavely shaped, or (c) both.

18. The insert mill according to claim 15, wherein the third lateral abutment surface is at least partially formed on the support web.

19. The cutting insert according to claim 1, wherein the entire cutting edge lies on a plane.

20. The cutting insert according to claim 1, wherein:
the overhanging portion has a lowermost point at a minimum upper sub-surface height $H_U$ above the base bearing surface, the minimum upper sub-surface height $H_U$ being measurable parallel to the insert axis; and
the minimum upper sub-surface height $H_U$ fulfills the condition: $0.35H_I \leq H_U \leq 0.85H_I$.

21. The cutting insert according to claim 1, wherein:
in at least one cross-section of each main sub-edge, the peripheral surface adjacent to the rake surface, is perpendicular to the rake surface; and
in at least one cross-section of each secondary sub-edge, the peripheral surface adjacent to the rake surface forms an acute relief angle ($\varepsilon$) with the rake surface.

22. The cutting insert according to claim 21, wherein:
in at least one other cross-section of each secondary sub-edge, the peripheral surface adjacent to the rake surface is perpendicular to the rake surface.

23. The cutting insert according to claim 1, wherein:
in at least a first cross-section of each secondary sub-edge, the peripheral surface adjacent to the rake surface, is perpendicular to the rake surface; and
in at least a second cross-section of each secondary sub-edge, the peripheral surface adjacent to the rake surface, forms an acute relief angle ($\varepsilon$) with the rake surface.

24. The cutting insert according to claim 20, wherein:
the minimum upper sub-surface height $H_U$ fulfills the condition: $0.4H_I \leq H_U \leq 0.6H_I$.

25. A single-sided three-way indexable cutting insert having a positive basic shape and comprising:
a material volume $V_F$ defined by the amount of material of the cutting insert;
a rake surface;
a base bearing surface located opposite the rake surface;
an insert axis ($A_I$) extending perpendicular to the base bearing surface and through a center of the insert, the insert axis defining: an upward direction from the base bearing surface towards the rake surface, a downward direction opposite to the upward direction, and an outward direction perpendicular to the upward and downward directions and extending away from the insert axis;
a cutting insert height ($H_I$) measurable parallel to the insert axis, from the base bearing surface to a highest point of the rake surface;
a peripheral surface connecting the rake surface and base bearing surface;
a cutting edge formed along an intersection of the peripheral surface and the rake surface, the cutting edge defining, in a top view parallel to the insert axis ($A_I$), an imaginary edge circumscribed circle ($C_E$) having an edge circumscribed diameter $D_E$; and
a screw hole opening out to the rake and base bearing surfaces, the screw hole comprising:
a screw hole bottom at an intersection with the base bearing surface;
a screw hole top at an intersection with the rake surface;
a void volume $V_s$ defined as the volume of a void extending from the screw hole bottom to the screw hole top; and
a hole circle ($C_S$) defined, in said top view parallel to the insert axis ($A_I$), at an intersection of the rake surface and the screw hole, the hole circle ($C_S$) having a hole diameter $D_S$;
the base bearing surface defining, in a bottom view parallel to the insert axis ($A_I$), an imaginary base circumscribed circle ($C_B$) having a base diameter $D_B$;
the peripheral surface including an upper sub-surface adjacent the rake surface, the upper sub-surface comprising an overhanging portion;
the peripheral surface further including a lower sub-surface between the upper sub-surface and the base bearing surface, the lower sub-surface comprising six side abutment surfaces including first, second, third, fourth, fifth and sixth side abutment surfaces;
the cutting edge, in said top view parallel to the insert axis ($A_I$), defining an edge inscribed circle ($C_M$) having an edge inscribed diameter $D_M$;
wherein:
the lower sub-surface comprises a chamfer located between the base bearing surface and a remainder of the lower sub-surface, the remainder being located between the chamfer and the upper sub-surface;
the remainder of the lower sub-surface is parallel to the insert axis ($A_I$);
said six side abutment surfaces are formed on said remainder of the lower sub-surface and are also parallel to the insert axis ($A_I$);
the edge circumscribed diameter $D_E$ fulfills the condition: $D_E<6$ mm;
the base circumscribed diameter $D_B$ is smaller than the edge circumscribed diameter $D_E$;
a volume ratio $V_S/V_F$ of the void volume $V_S$ to the material volume $V_F$ fulfills the condition: $0.5>V_S/V_F \geq 0.30$;
the overhanging portion has a lowermost point at a minimum upper sub-surface height HU above the base bearing surface, the minimum upper sub-surface height HU being measurable parallel to the insert axis; and
the minimum upper sub-surface height HU fulfills the condition: $0.35HI \leq HU \leq 0.85HI$.

26. The cutting insert according to claim 25, wherein:
the minimum upper sub-surface height $H_U$ fulfills the condition: $0.4H_I \leq H_U \leq 0.6H_I$.

27. A single-sided three-way indexable cutting insert having a positive basic shape and comprising:
- a material volume $V_F$ defined by the amount of material of the cutting insert;
- a rake surface;
- a base bearing surface located opposite the rake surface;
- an insert axis ($A_I$) extending perpendicular to the base bearing surface and through a center of the insert, the insert axis defining: an upward direction from the base bearing surface towards the rake surface, a downward direction opposite to the upward direction, and an outward direction perpendicular to the upward and downward directions and extending away from the insert axis;
- a cutting insert height ($H_I$) measurable parallel to the insert axis, from the base bearing surface to a highest point of the rake surface;
- a peripheral surface connecting the rake surface and base bearing surface;
- a cutting edge formed along an intersection of the peripheral surface and the rake surface, the cutting edge defining, in a top view parallel to the insert axis ($A_I$), an imaginary edge circumscribed circle ($C_E$) having an edge circumscribed diameter $D_E$; and
- a screw hole opening out to the rake and base bearing surfaces, the screw hole comprising:
  - a screw hole bottom at an intersection with the base bearing surface;
  - a screw hole top at an intersection with the rake surface;
  - a void volume $V_s$ defined as the volume of a void extending from the screw hole bottom to the screw hole top; and
  - a hole circle ($C_S$) defined, in said top view parallel to the insert axis ($A_I$), at an intersection of the rake surface and the screw hole, the hole circle ($C_S$) having a hole diameter $D_S$;
- the base bearing surface defining, in a bottom view parallel to the insert axis ($A_I$), an imaginary base circumscribed circle ($C_B$) having a base diameter $D_B$;
- the peripheral surface including an upper sub-surface adjacent the rake surface, the upper sub-surface comprising an overhanging portion;
- the peripheral surface further including a lower sub-surface between the upper sub-surface and the base bearing surface, the lower sub-surface comprising six side abutment surfaces including first, second, third, fourth, fifth and sixth side abutment surfaces;
- the cutting edge, in said top view parallel to the insert axis ($A_I$), defining an edge inscribed circle ($C_M$) having an edge inscribed diameter $D_M$, the cutting edge comprising:
  - exactly three main sub-edges and exactly three secondary sub-edges, the main sub-edges alternating with the secondary sub-edges with a corner sub-edge at each intersection between the main and secondary sub-edges;

wherein:
- the edge circumscribed diameter $D_E$ fulfills the condition: $D_E < 6$ mm;
- the base circumscribed diameter $D_B$ is smaller than the edge circumscribed diameter $D_E$;
- a volume ratio $V_S/V_F$ of the void volume $V_S$ to the material volume $V_F$ fulfills the condition: $0.5 > V_S/V_F \geq 0.30$;
- in at least one cross-section of each main sub-edge, the peripheral surface adjacent to the rake surface is perpendicular to the rake surface; and
- in at least one cross-section of each secondary sub-edge, the peripheral surface adjacent to the rake surface forms an acute relief angle ($\varepsilon$) with the rake surface.

28. The cutting insert according to claim 27, wherein:
- in at least one other cross-section of each secondary sub-edge, the peripheral surface adjacent to the rake surface is perpendicular to the rake surface.

* * * * *